United States Patent
Benco et al.

(10) Patent No.: US 7,236,780 B2
(45) Date of Patent: Jun. 26, 2007

(54) METHOD FOR CHANGING MOBILE SUBSCRIBER SERVICE PLAN

(75) Inventors: David S. Benco, Winfield, IL (US); Kevin J. Overend, Elmhurst, IL (US); Baoling S. Sheen, Naperville, IL (US); Sandra L. True, St. Charles, IL (US); Kenneth J. Voight, Sugar Grove, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 247 days.

(21) Appl. No.: 10/623,695

(22) Filed: Jul. 21, 2003

(65) Prior Publication Data

US 2005/0020243 A1 Jan. 27, 2005

(51) Int. Cl.
*H04Q 7/20* (2006.01)

(52) U.S. Cl. .............................. 455/432.1; 455/432.3; 455/406; 455/418; 455/414.1

(58) Field of Classification Search ............. 455/432.1, 455/432.3, 418, 419, 414.1, 414.3, 406, 407, 455/408, 433
See application file for complete search history.

(56) References Cited

U.S. PATENT DOCUMENTS

| | | | | |
|---|---|---|---|---|
| 5,684,859 A | * | 11/1997 | Chanroo et al. ............ 455/433 |
| 6,097,942 A | * | 8/2000 | Laiho ....................... 455/414.1 |
| 6,212,408 B1 | * | 4/2001 | Son et al. ................... 455/563 |
| 6,381,456 B1 | * | 4/2002 | Ko .......................... 455/435.1 |
| 6,453,162 B1 | * | 9/2002 | Gentry ....................... 455/433 |
| 6,466,783 B2 | * | 10/2002 | Dahm et al. ............. 455/414.2 |
| 6,795,703 B2 | * | 9/2004 | Takae et al. ................ 455/418 |
| 2001/0000505 A1 | * | 4/2001 | Segal et al. ................ 455/405 |
| 2002/0045973 A1 | * | 4/2002 | Odashima et al. ............ 701/1 |
| 2002/0115447 A1 | * | 8/2002 | Martin et al. ............... 455/456 |
| 2003/0013434 A1 | * | 1/2003 | Rosenberg et al. ......... 455/414 |
| 2004/0180648 A1 | * | 9/2004 | Hymel et al. ............... 455/418 |
| 2005/0190789 A1 | * | 9/2005 | Salkini et al. .............. 370/466 |

* cited by examiner

*Primary Examiner*—George Eng
*Assistant Examiner*—Huy Phan

(57) ABSTRACT

A method for automating changes to a service plan between a mobile subscriber and a wireless service provider is provided. In one embodiment, the method creates a temporary service plan for the subscriber. This method includes: a) receiving a request to create the temporary plan, b) retrieving the subscriber's existing service plan from a subscriber database, c) providing a change selection menu to the user, d) modifying the existing service plan in conjunction with one or more user selections associated with the change selection menu to create the temporary plan, and e) storing the temporary plan in the subscriber database. In another embodiment, the method modifies the subscriber's existing service plan and the modified service plan supercedes the previous service plan. In another aspect, a method for processing a call from a mobile station associated with the subscriber when the temporary service plan is in effect is provided.

19 Claims, 4 Drawing Sheets

METHOD FOR CHANGING MOBILE SUBSCRIBER SERVICE PLAN

BACKGROUND OF INVENTION

The invention generally relates to a method for automating changes to a service plan between a mobile subscriber and a wireless service provider and, more particularly, to a method for creating a temporary service plan, a method for modifying an existing service plan, and a method for processing a call when a temporary service plan is in effect. Accordingly, it will be described with particular reference thereto. However, it is to be appreciated that the invention is also amenable to other applications.

A number of mobile subscribers have a service package that allows calls to be made from a local calling area. When roaming out of this local calling area, the subscriber is charged a roaming fee and a high per minute charge. Many mobile subscribers, therefore, do not use their personal mobile station when on vacation or when on a business trip because they do not want to pay the high costs associated with calling from outside their home network.

For these times when a subscriber would like to have the capability of using their mobile station from outside their local calling area, such as when going on vacation or traveling on business, it would be helpful and convenient to be able to temporarily change their service package to include nationwide service. So, for example, if you have a trip planned to Florida in June, you can switch from a local calling plan to a nationwide plan for the June billing cycle. Many service providers allow for this temporary change in service plan, but it requires that you call the service provider or visit one of their store locations. Then, at the end of the current billing cycle, another call or visit is required in order to change back to the lower priced local calling plan.

Thus, there is motivation for a more automated method of changing a mobile subscriber's service plan.

BRIEF SUMMARY OF INVENTION

In one aspect of the invention, a method for creating a temporary service plan for a subscriber of a wireless service provider when the subscriber currently has a normal service plan with the wireless service provider is provided. The method includes: a) receiving a request to create the temporary service plan from a user, b) retrieving the subscriber's normal service plan from a subscriber database, c) providing a change selection menu to the user in response to the request, d) modifying the normal service plan in conjunction with one or more user selections associated with the change selection menu to create the temporary service plan, and e) storing the temporary service plan in the subscriber database.

In another aspect of the invention, a method for modifying a service plan for a subscriber of a wireless service provider is provided. The method includes: a) receiving a call from a user requesting status of the service plan, wherein the call is initiated by the user via a telephone device, b) retrieving the service plan from a subscriber database, c) reporting the service plan to the user in response to the status request, d) receiving a request to modify the service plan from the user via the telephone device, e) verifying the user has authority associated with the subscriber to modify the service plan, f) providing a change selection menu to the user in response to the modification request, g) modifying the service plan in conjunction with one or more user selections associated with the change selection menu, and h) storing the modified service plan in the subscriber database.

In still another aspect of the invention, a method for processing a call from a mobile station in a wireless network when the call is associated with a subscriber having a normal service plan with a wireless service provider associated with the wireless network is provided. The method includes: a) receiving the call from the mobile station, b) determining if the subscriber has a temporary service plan that is in effect with the wireless service provider, and c) if a temporary service plan is in effect, continuing to process the call and determining charges for the call according to the temporary service plan.

Benefits and advantages of the invention will become apparent to those of ordinary skill in the art upon reading and understanding the description of the invention provided herein.

BRIEF DESCRIPTION OF DRAWINGS

The invention is described in more detail in conjunction with a set of accompanying drawings.

DETAILED DESCRIPTION

Figure 1:
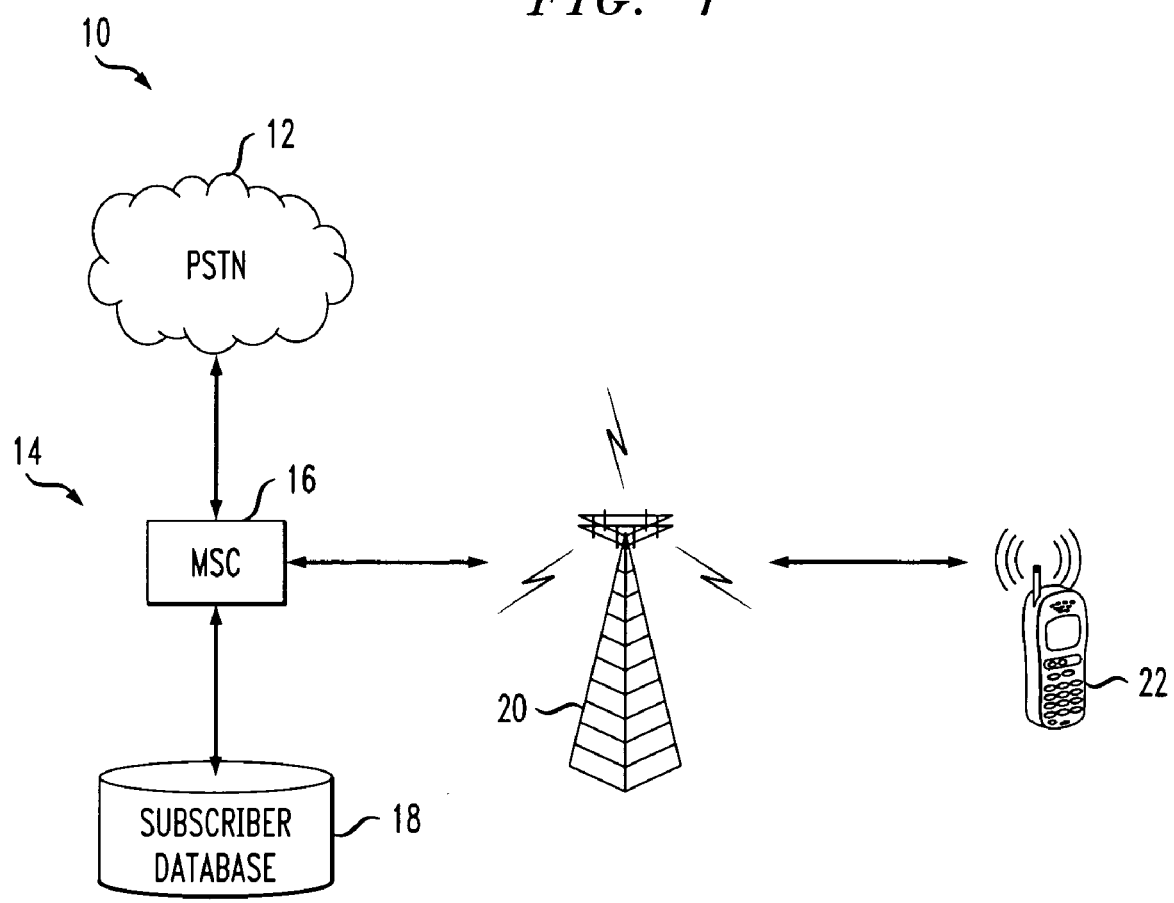
FIG. 1 is a block diagram of an embodiment of a telecommunication system incorporating the invention.

While the invention is described in conjunction with the accompanying drawings, the drawings are for purposes of illustrating exemplary embodiments of the invention and are not to be construed as limiting the invention to such embodiments. It is understood that the invention may take form in various components and arrangement of components and in various steps and arrangement of steps beyond those provided in the drawings and associated description. In the drawings, like reference numerals denote like elements and similar reference numerals denote similar elements.

With reference to FIG. 1, a telecommunication system 10 incorporating the invention includes a public switched telephone network (PSTN) 12 and a wireless network 14. The wireless network 14 includes at least one mobile switching center (MSC) 16, at least one subscriber database 18, at least one base station (BS) 20, and at least one mobile station (MS) 22. The subscriber database 18 stores a service plan for at least one mobile subscriber associated with a wireless service provider providing service via the wireless network 14.

The wireless network 14 includes processes that allow the mobile subscriber to change an existing or normal service plan with the wireless service provider using a telephone device (e.g., a conventional land line telephone, a cordless telephone, a mobile station, etc.). Preferably, the processes are implemented in the MSC 16, although the processes may, alternatively or in combination, be implemented in one or more peripheral devices and/or auxiliary components associated with the MSC. The processes are automated within the wireless network 14 and interact with the user via the telephone device. The interactivity of the process may be either based on interactive audio, interactive graphics (e.g., text, symbols, icons, or other graphics), or combinations thereof. The wireless network 14 may also be adapted to allow the mobile subscriber to change the service plan using a Web-based interface accessible, for example, via the Internet or by dialup connection. The mobile subscriber may use any suitable computer device with access to the wireless service provider's Web-based interface to change the service plan.

In one embodiment, the process allows the user to modify the existing or normal service plan stored in the subscriber database 18. For example, the existing service plan is modified by changing from a local option to a nationwide option or vice versa. Other types of changes include, but are not limited to, changing the quantity of airtime associated with a predetermined period of calendar time (e.g., month, year, etc.) and extending or otherwise changing the expiration date for the existing service plan. The modified service plan is stored in the subscriber database 18. The modified service plan is effective until subsequent changes are made or until it expires on its own terms.

In another embodiment, the process allows the user to create a temporary service plan based on the existing or normal service plan stored in the subscriber database 18. For example, the normal service plan is modified by changing from a local option to a nationwide option or vice versa. The quantity of airtime associated with a predetermined period of calendar time (e.g., month, year, etc.) may also be changed. When the desired options for the temporary service plan are selected, the user selects a desired date for expiration of the temporary service plan. The temporary service plan is stored in the subscriber database 18. The temporary service plan is effective until subsequent changes are made or until it expires on its own terms.

For example, the processes support automatic activation and deactivation of nationwide service within the wireless network 14 on a per-subscriber basis. The processes save the mobile subscriber the time and inconvenience of having to make calls to a wireless service provider's customer service line or visits to a wireless service provider's store location. The processes also save the service provider the cost of customer service personnel or store personnel. For example, the processes allow the mobile subscriber to interact directly with the wireless network 14 in order to activate or terminate a nationwide service plan with a higher subscription fee in order to avoid more expensive long distance charges.

Figure 2:
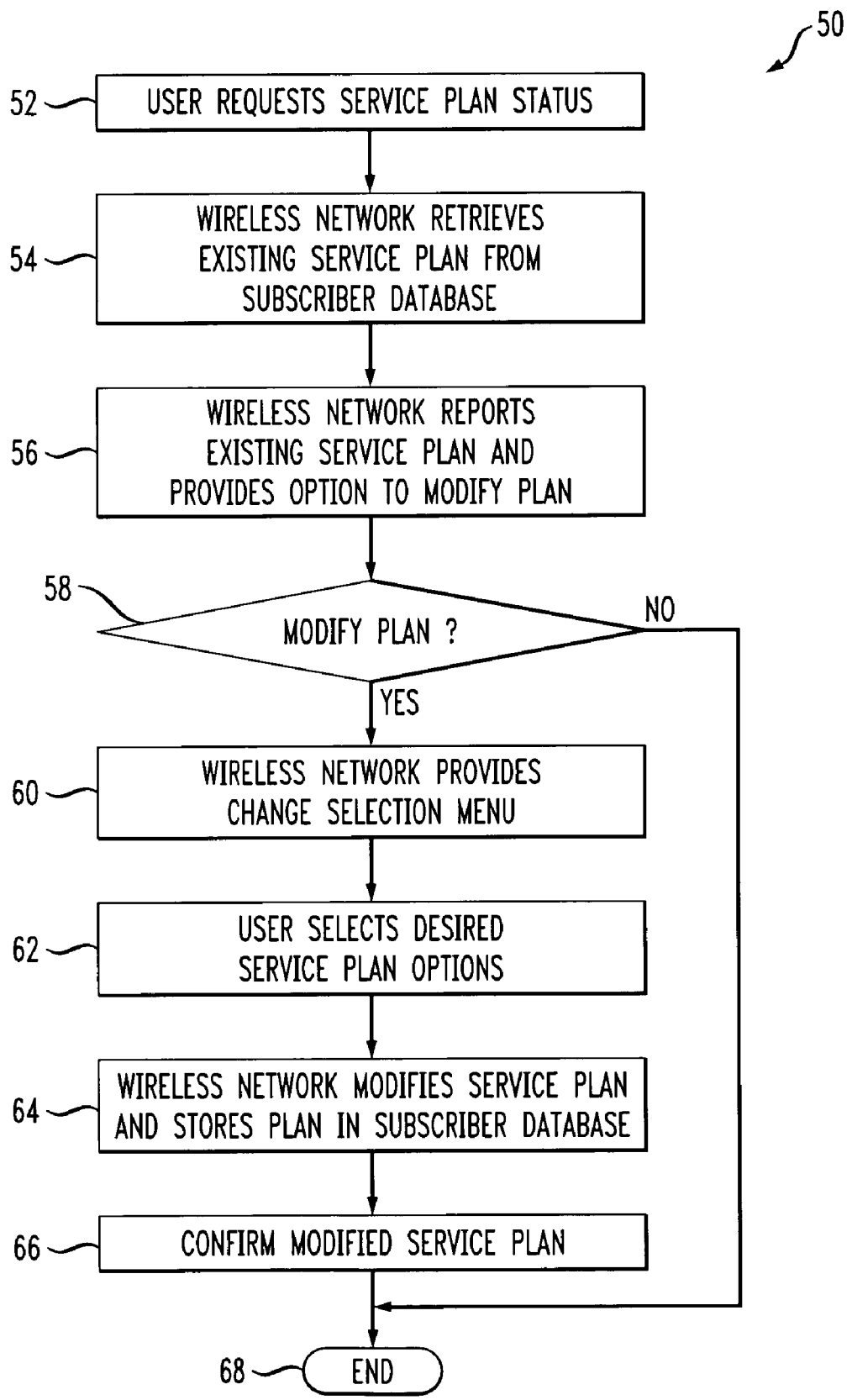
FIG. 2 is a flowchart of an embodiment of a process allowing a user to modify an existing or normal service plan between a mobile subscriber and a wireless service provider.

With reference to FIG. 2, an embodiment of a process 50 allowing a user to modify an existing or normal service plan between a mobile subscriber and a wireless service provider begins at step 52 when the user requests service plan status from the wireless network. This is typically accomplished by dialing a predetermined sequence of digits from a telephone device. The telephone device may be an MS associated with the subscriber/service plan or another type of telephone device.

At step 54, in response to the status request, the wireless network retrieves the existing service plan associated with the subscriber from a subscriber database. Next, the wireless network reports the existing service plan to the user and provides the user with an option to modify the service plan (step 56). The status and modification option may be provided via audio or graphics to the telephone device.

The user may request to modify the service plan, for example, by selectively speaking a predetermined word or by pressing a predetermined key. At step 58, the wireless network determines if the user has requested to modify the service plan. If the user has requested to modify the service plan, the wireless network receives the request. At this point (or at an earlier point), the wireless network may verify that the user has authority associated with the subscriber to modify the service plan.

Next, at step 60, the wireless network provides a change selection menu to the user in response to the modification request. The change selection menu may include an interactive audio portion, an interactive graphical display (e.g., text, symbols, icons, or other graphics), or any combination thereof. The change selection menu may allow the user to, for example, choose between local and nationwide service plans, select a quantity of airtime (e.g., hours) associated with a predetermined period of calendar time (e.g., month), and select a date for extension and expiration of the service plan. At step 62, the user selects desired service plan options associated with the change selection menu, for example, by selectively speaking a predetermined word or by pressing a predetermined key.

Next, at step 64, the wireless network modifies the service plan in conjunction with the user selections associated with the change selection menu and stores the modified service plan in the subscriber database. Prior to storing the modified service plan, the wireless network may provide the user with a service plan status in order to confirm that the changes about to be made are acceptable to the user. At step 66, the wireless network confirms that the modified service plan was properly stored in the subscriber database. At this point, the process has reached its end (step 68).

At step 58, if the user did not request to modify the service plan, the process has reached its end (step 68).

Figure 3:
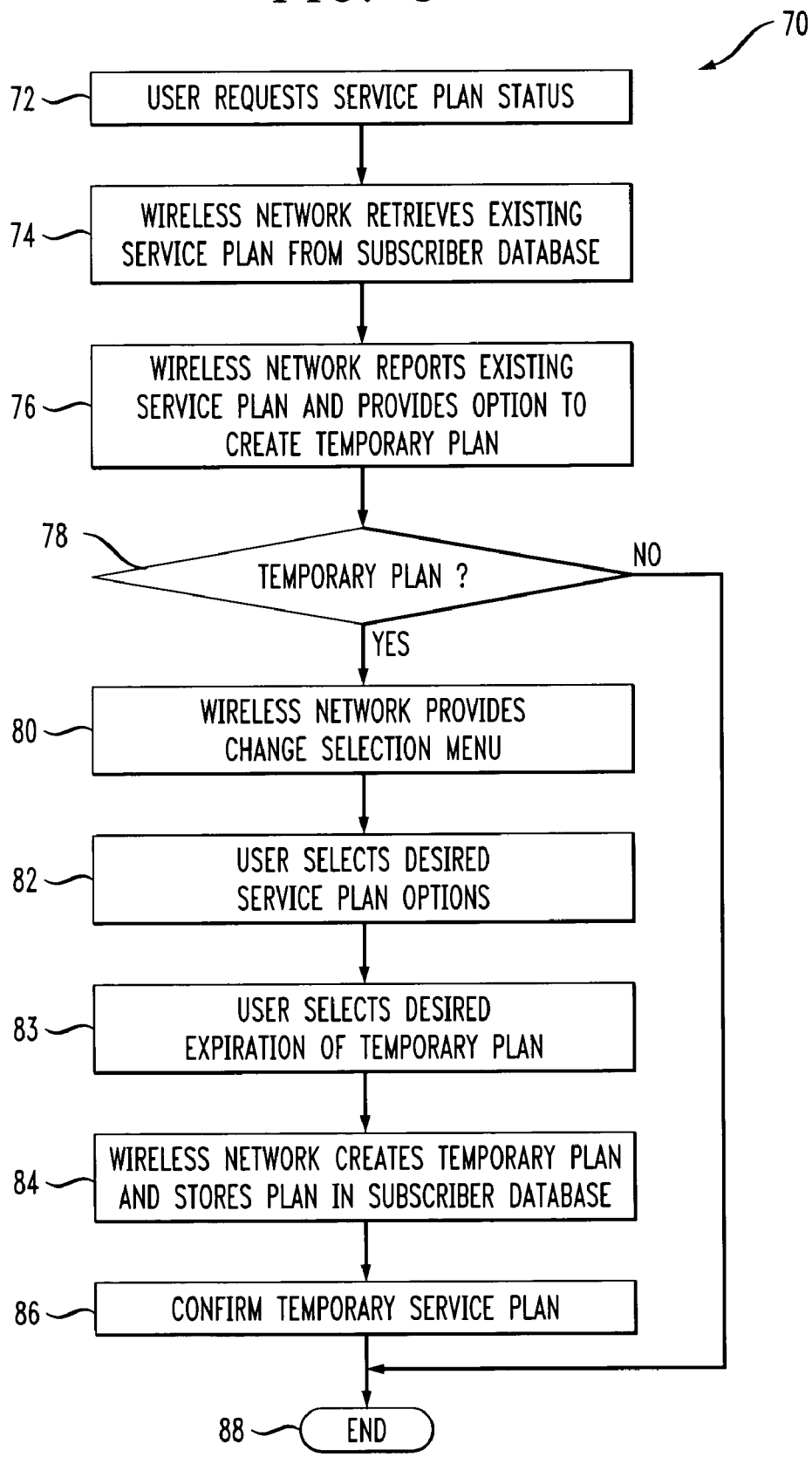
FIG. 3 is a flowchart of an embodiment of a process allowing a user to create a temporary service plan between a mobile subscriber and a wireless service provider.

With reference to FIG. 3, an embodiment of a process 70 allowing a user to create a temporary service plan between a mobile subscriber and a wireless service provider begins at step 72 when the user requests service plan status from the wireless network. This is typically accomplished by dialing a predetermined sequence of digits from a telephone device. The telephone device may be an MS associated with the subscriber/service plan or another type of telephone device.

At step 74, in response to the status request, the wireless network retrieves an existing service plan associated with the subscriber from a subscriber database. Next, the wireless network reports the existing service plan to the user and provides the user with an option to create the temporary service plan (step 76). The status and creation option may be provided via audio or graphics to the telephone device. The user may request to create the temporary service plan, for example, by selectively speaking a predetermined word or by pressing a predetermined key. At step 78, the wireless network determines if the user has requested to create the temporary service plan. If the user has requested to create the temporary service plan, the wireless network receives the request. At this point (or at an earlier point), the wireless network may verify that the user has authority associated with the subscriber to create the temporary service plan.

Next, at step 80, the wireless network provides a change selection menu to the user in response to the creation request. The change selection menu may include an interactive audio portion, an interactive graphical display (e.g., text, symbols, icons, or other graphics), or any combination thereof. The change selection menu may allow the user to, for example, choose between local and nationwide service plans, select a quantity of airtime (e.g., hours) associated with a predetermined period of calendar time (e.g., month), and select a date for expiration of the temporary service plan. At step 82, the user selects desired service plan options associated with the change selection menu, for example, by selectively speaking a predetermined word or by pressing a predetermined key. At step 83, the user selects a desired date for expiration of the temporary service plan, for example, by selectively speaking a predetermined word or by pressing a predetermined key.

Next, at step 84, the wireless network creates the temporary service plan in conjunction with the user selections associated with the change selection menu and stores the temporary service plan in the subscriber database. Prior to storing the temporary service plan, the wireless network may provide the user with a temporary service plan status in order to confirm that the options about to be stored in the temporary plan are acceptable to the user. At step 86, the wireless network confirms that the temporary service plan was properly stored in the subscriber database. At this point, the process has reached its end (step 88).

At step 78, if the user did not request to create the temporary service plan, the process has reached its end (step 88).

An example of an interactive audio sequence between the user and the wireless network is as follows:

"Mary True, you currently are enrolled in the Regional Calling Plan. Your Service Plan will expire on Jan. 1, 2004. Press 1 if you would like to activate the Nationwide Calling Plan for a monthly fee of $39.99. Press 2 if your would like to activate the Worldwide Calling Plan for a monthly fee of $99. Press 3 if you would like to keep your current calling plan."

In response, for example, the user presses "1." Next, the wireless network provides the following exemplary message:

"Now enter the date that you would like this Service Plan selection to expire and return to your default Service Plan. Enter the date in MMDDYYYY format using your keypad."

In response, for example, the user presses "01012004." Next, the wireless network provides the following exemplary message:

"Enter 1 to confirm your selection. Enter 2 to return to the Service Plan Selection Menu."

In response, for example, the user presses "1."

An example of an interactive audio confirmation sequence between the user and the wireless network includes the following information:

"Mary True, your request to update your Service Plan from the Regional Calling Plan to the Nationwide Calling Plan has been accepted. This new plan will expire on Jan. 1, 2004, at which time you will return to your default plan which is the "Regional Calling Plan."

An example of an interactive graphical display sequence between the user and the wireless network includes the following information:

"Regional Calling Plan Active Until Jan. 1, 2004.
Choose one of the following options:
1. Activate Nationwide Calling Plan for $39.99/month.
2. Activate Worldwide Calling Plan for $99/month.
3. Retain Current Calling Plan.
Enter Expiration Date (MMDDYYYY) for Calling Plan:
MMDDYYYY"

In response, for example, the user selects "1" for the Nationwide Calling Plan and enters "01012004" to complete the date field.

An example of an interactive graphical display confirmation sequence between the user and the wireless network includes the following information:
"Service Plan Change Request Completed.
Nationwide Calling Plan now in effect until Jan. 1, 2004."

Figure 4:
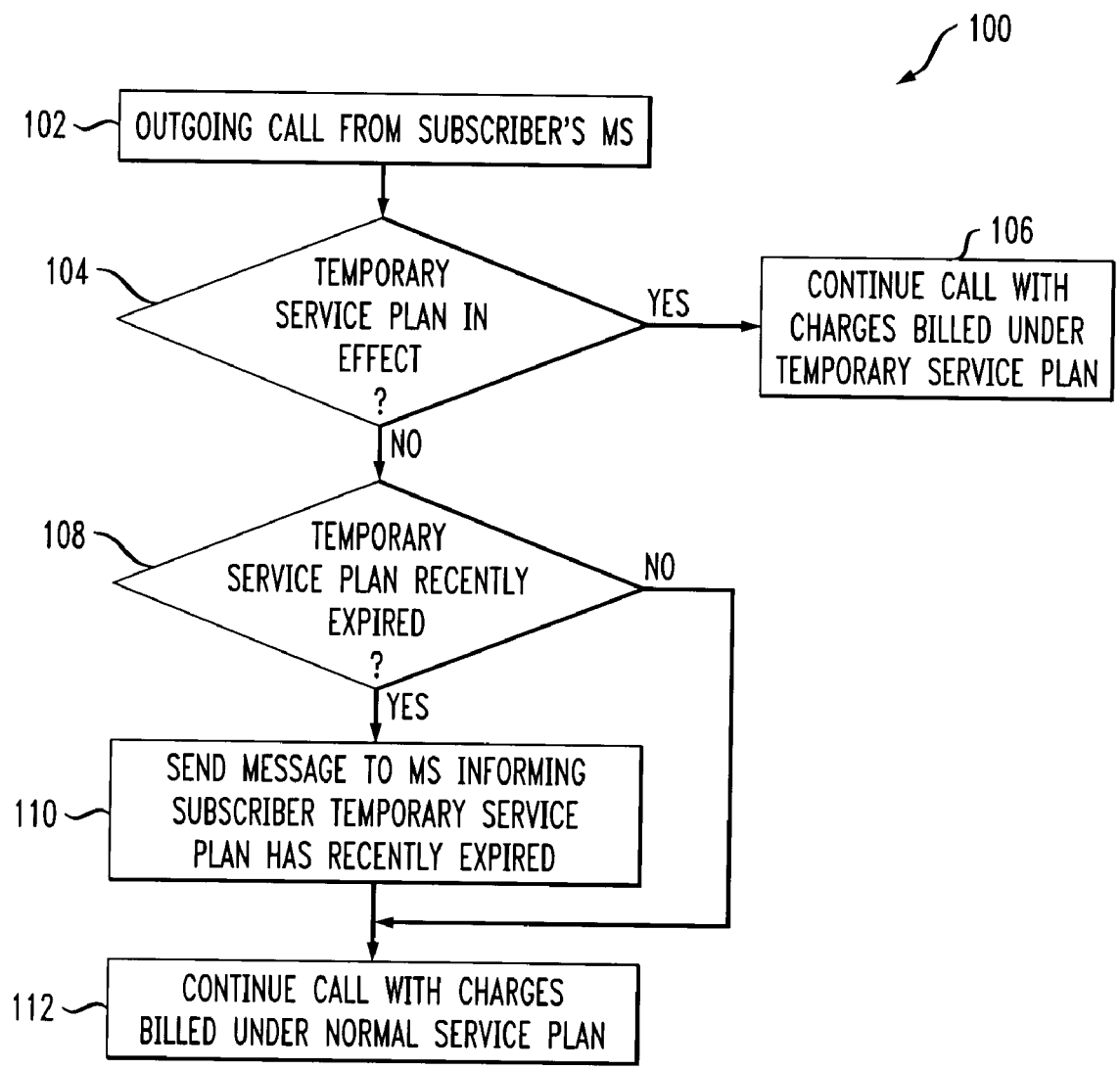
FIG. 4 is a flowchart of an embodiment of a method for processing a call from a mobile station associated with a subscriber having a temporary service plan.

With reference to FIG. 4, a method 100 for processing a call from an MS associated with a subscriber having a temporary service plan begins at step 102 when the wireless network receives an outgoing call from the MS. Next, at step 104, the wireless network determines if the subscriber has a temporary service plan that is in effect with the wireless service provider. If a temporary service plan is in effect, the wireless network continues to process the call and the wireless service provider determines charges for the call according to the temporary service plan (step 106).

Otherwise, at step 108, the wireless network determines if the subscriber had a temporary service plan that recently expired (e.g., within the last month, since the last billing cycle, etc.). Next, at step 110, if a temporary service plan recently expired, the wireless network sends a message to the MS informing the user that a temporary service plan has recently expired. Then, the wireless network continues to process the call and the wireless service provider determines charges for the call according to the existing or normal service plan (step 112).

At step 108, if a temporary service plan has not recently expired, the wireless network continues to process the call and the wireless service provider determines charges for the call according to the existing or normal service plan (step 112).

In summary, one embodiment of the invention provides a methodology for enabling the wireless network to automatically accept subscriber requests to change from a local calling plan to a nationwide calling plan for a prescribed period or until further notice. Additionally, the methodology enables the wireless network to automatically accept subscriber requests to change back to the local calling plan from the nationwide calling plan.

In one implementation, the subscriber dials a specific series of digits on their MS or selects a menu option on their MS which, in turn, sends a message to the network to activate the nationwide calling plan. The wireless network receives the message from the MS and updates subscriber data. Subsequently, when the mobile subscriber makes calls outside their local calling area, they may not necessarily be charged roaming or per minute charges. Instead, they may only be charged minutes against the nationwide service plan.

Later (e.g., at the conclusion of travel by the mobile subscriber), the mobile subscriber dials a specific series of digits on the MS to notify the wireless network to deactivate the nationwide calling plan and return to the normal service plan. Alternatively, upon expiration of the time period specified by the mobile subscriber upon initiation of the nationwide service plan, the wireless network automatically returns the mobile subscriber to the normal service plan.

When the invention is implemented in a wireless network, a mobile subscriber can call their wireless service provider and request a change in service plans without human intervention on the part of the wireless service provider. The mobile subscriber may initiate the change in service using his/her MS. Then, the mobile subscriber can manually terminate the change in service, or it can be automatically accomplished in the network based on a pre-defined time that the mobile subscriber would like the nationwide service activated.

Some commercial benefits of the invention includes no human intervention and assistance needs to be provided by the wireless service providers' customer service department. In addition, the mobile subscriber benefits since it only requires, for example, a few keystrokes to activate and terminate changes to the service plan and will not require them to call customer service for assistance.

While the invention is described herein in conjunction with exemplary embodiments, it is evident that many alternatives, modifications, and variations will be apparent to those skilled in the art. Accordingly, the embodiments of the invention in the preceding description are intended to be illustrative, rather than limiting, of the spirit and scope of the invention. More specifically, it is intended that the invention embrace all alternatives, modifications, and variations of the exemplary embodiments described herein that fall within the spirit and scope of the appended claims or the equivalents thereof.

We claim:

1. A method for creating a temporary service plan for a subscriber of a wireless service provider when the subscriber currently has a normal service plan with the wireless service provider, the method including the steps of:
   receiving a request to create the temporary service plan from a user;
   retrieving the subscriber's normal service plan from a subscriber database;
   reporting the normal service plan to the user;
   providing a change selection menu to the user in response to the request;
   creating the temporary service plan in conjunction with one or more user selections associated with the change selection menu;
   storing the temporary service plan in the subscriber database; and
   receiving a request for service plan status from the user.

2. The method as set forth in claim 1 wherein the user transmits the received request to create the temporary service plan using a mobile station associated with the subscriber's normal service plan.

3. The method as set forth in claim 1, further including:
   verifying the user has authority associated with the subscriber to create the temporary service plan.

4. The method as set forth in claim 1 wherein the request from the user is via a call to one of a switching center, a peripheral device and an auxiliary component associated with the wireless service provider from a telephone device.

5. The method as set forth in claim 4 wherein the change selection menu provided to the user includes an automated interactive audio portion.

6. The method as set forth in claim 4 wherein the change selection menu provided to the user includes an interactive graphical display portion.

7. The method as set forth in claim 1 wherein the change selection menu provided to the user includes a portion for selection between a nationwide plan and a local plan.

8. The method as set forth in claim 1 wherein the change selection menu provided to the user includes a portion for selection of a quantity of airtime associated with a predetermined period of calendar time.

9. The method as set forth in claim 1 wherein the change selection menu provided to the user includes a portion for selection of a date for expiration of the temporary service plan.

10. A method for modifying a service plan for a subscriber of a wireless service provider, the method including the steps of:
   a) receiving a call from a user requesting status of the service plan, wherein the call is initiated by the user via a telephone device
   b) retrieving the service plan from a subscriber database;
   c) reporting the service plan to the user in response to the status request;
   d) receiving a request to modify the service plan from the user via the telephone device;
   e) verifying the user has authority associated with the subscriber to modify the service plan;
   f) providing a change selection menu to the user in response to the modification request;
   g) modifying the service plan or creating a temporary service plan in conjunction with one or more user selections associated with the change selection menu; and
   h) storing the modified service plan in the subscriber database;
   wherein receiving the call, retrieving the service plan, reporting the service plan, receiving a request to modify the service plan, verifying the user has authority, providing a change selection menu, modifying the service plan or creating the temporary service plan and storing the modified service plan are each performed by a device associated with the wireless service provider.

11. The method as set forth in claim 10 wherein the telephone device is a mobile station associated with the subscriber's service plan.

12. The method as set forth in claim 10 wherein the change selection menu provided to the user includes an automated interactive audio portion.

13. The method as set forth in claim 10 wherein the change selection menu provided to the user includes an interactive graphical display portion.

14. The method as set forth in claim 10 wherein the change selection menu provided to the user includes a portion for selection between a nationwide plan and a local plan.

15. The method as set forth in claim 10 wherein the change selection menu provided to the user includes a portion for selection of a quantity of airtime associated with a predetermined period of calendar time.

16. The method as set forth in claim 10 wherein the change selection menu provided to the user includes a portion for selection of a date for extension and expiration of the service plan.

17. A method for processing a call from a mobile station in a wireless network when the call is associated with a subscriber having a normal service plan with a wireless service provider associated with the wireless network, the method including the steps of:
   a) receiving the call from the mobile station;
   b) determining if the subscriber has a temporary service plan that is in effect with the wireless service provider;
   c) if a temporary service plan is in effect, continuing to process the call and determining charges for the call according to the temporary service plan;
   d) if a temporary service plan is not in effect, determining if the subscriber had a temporary service plan that recently expired; and
   e) if a temporary service plan recently expired, sending a message to the mobile station informing the user that a temporary service plan has recently expired, continuing to process the call, and determining charges for the call according to the normal service plan.

18. The method as set forth in claim 17, further including f) if a temporary service plan has not recently expired, continuing to process the call and determining charges for the call according to the normal service plan.

19. A method for providing service plan flexibility to a wireless service subscriber the method comprising:

establishing a normal service plan having a normal plan start date and a normal plan end date in association with a directory number;

establishing a temporary service plan in association with the same directory number;

associating a temporary plan start time or date with the temporary service plan;

associating a temporary plan expiration time and/or date with the temporary service plan, wherein the temporary plan start time or date and expiration time or date are between the normal plan start and end dates;

billing calls according to the temporary service plan if a current time is within a range associated with the temporary plan start time and/or date and the temporary plan expiration time and/or date; and billing calls according to the normal plan if the current time is outside the range associated with the temporary plan start time and/or date and the temporary plan expiration time and/or date.

\* \* \* \* \*